United States Patent [19]
Pla

[11] Patent Number: 5,590,849
[45] Date of Patent: Jan. 7, 1997

[54] ACTIVE NOISE CONTROL USING AN ARRAY OF PLATE RADIATORS AND ACOUSTIC RESONATORS

[75] Inventor: Frederic G. Pla, Clifton Park, N.Y.

[73] Assignee: General Electric Company, Schenectady, N.Y.

[21] Appl. No.: 359,162

[22] Filed: Dec. 19, 1994

[51] Int. Cl.$^6$ .............................. G10K 11/16; F01D 5/26
[52] U.S. Cl. ............................ 244/1 N; 381/71; 181/206
[58] Field of Search ................................... 244/1 N, 53 R; 415/119, 118; 181/206, 20; 381/71, 152, 64; 340/388.1, 388.3

[56] References Cited

U.S. PATENT DOCUMENTS

| | | |
|---|---|---|
| 1,688,743 | 10/1928 | Nicolson . |
| 4,551,849 | 11/1985 | Kasai et al. . |
| 4,700,177 | 10/1987 | Nakashima et al. . |
| 4,715,559 | 12/1987 | Fuller . |
| 4,751,419 | 6/1988 | Takahata . |
| 4,947,434 | 8/1990 | Ito . |
| 5,031,222 | 7/1991 | Takaya . |
| 5,370,340 | 12/1994 | Pla . |

FOREIGN PATENT DOCUMENTS

| | | |
|---|---|---|
| 2-124598 | 5/1990 | Japan . |

OTHER PUBLICATIONS

Concurrently filed U.S. Patent application RD–23664, Frederic G. Pla, entitled "Noise Control Using A Plate Radiator And An Acoustic Resonator".

Concurrently filed U.S. Patent application RD–23317, Frederic G. Pla et al., entitled "Active Noise Control Using A Tunable Plate Radiator".

U.S. patent application Serial No. 08/143,602, filed Nov. 1, 1993, Frederic G. Pla et al., entitled "Active Noise Control Using Noise Source Having Adaptive Resonant Frequency Tuning Through Stiffness Variation".

U.S. Patent application Serial No. 08/143,605, filed Nov. 1, 1993, Frederic G. Pla et al., entitled "Active Noise Control Using Noise Source Having Adaptive Resonant Frequency Tuning Through Stress Variation".

U.S. Patent application Serial No. 08/143,604, filed Nov. 1, 1993, Frederic G. Pla et al., entitled "Active Noise Control Using Noise Source Having Adaptive Resonant Frequency Tuning Through Variable Panel Loading".

U.S. Patent application Serial No. 08/143,603, filed Nov. 1, 1993, Frederic G. Pla et al., entitled "Active Noise Control Using Noise Source Having Adaptive Resonant Frequency Tuning Through Variable Ring Loading".

See "Background of Invention" in present application.

U.S. Patent application RD–23528, Frederic G. Pla et al., entitled "Active Noise Control Of Aircraft Engine Discrete Tonal Noise" (filing receipt not yet received).

*Primary Examiner*—Galen L. Barefoot
*Attorney, Agent, or Firm*—Douglas E. Erickson; Marvin Snyder

[57] ABSTRACT

An active noise control subassembly array for reducing noise caused by a source (such as an aircraft engine). A pair of subassemblies each has a piezoceramic-driven noise radiating panel to generate a panel noise canceling at least some of the source noise. A front plate is spaced apart from the panel and has a sound exit port. A first pair of spaced-apart side walls each generally abuts the panel and the front plate so as to generally enclose a front cavity to define a resonator. A back plate is spaced apart from the panel by a second pair of side walls. The pair of subassemblies are spaced apart to create a space between their adjacent side walls. A third subassembly is similar to the pair of subassemblies but may have a different resonant frequency and is positioned such that the back plates of the subassembly pair serve as the front plate of the third subassembly with the space between the subassembly pair serving as the sound exit port of the third subassembly.

10 Claims, 3 Drawing Sheets

ACTIVE NOISE CONTROL USING AN ARRAY OF PLATE RADIATORS AND ACOUSTIC RESONATORS

BACKGROUND OF THE INVENTION

The present invention relates generally to reducing noise from a source, and more particularly to an array of active noise control subassemblies capable of generating a canceling noise to offset such source noise.

A noise source may produce discrete tonal noise (having one or more discrete frequencies), narrowband noise, and/or broadband noise. Noise sources include, but are not limited to medical MRI (magnetic resonance imaging) systems and aircraft engines. Aircraft engines especially produce discrete tonal noise from fans and turbines. Such noise from larger aircraft engines, presently under development, may pose a problem in the vicinity of airports during aircraft take off and landing operations. Also, future aircraft noise regulations may pose a problem for existing aircraft engines.

Known passive noise control techniques for reducing aircraft engine noise include noise absorbing liners and tuned resonators usually mounted at the engine inlet and outlet to reduce the level of discrete tonal noise radiated outside the engine. However, the effectiveness of passive noise control treatment would be greatly reduced for engines with large fan diameters because of the lower fan blade passage frequency.

Known active noise control techniques for reducing aircraft engine discrete tonal noise generate a canceling noise forward and aft of the fan. The frequency of the canceling noise is equal to the blade passage frequency (and/or multiples thereof) as determined from engine speed using a tachometer. The amplitude and phase of the canceling noise is determined by a computer using feedback and/or feedforward control techniques with sound inputs from a microphone array disposed in the vicinity of the fan and the canceling noise such that the canceling noise is generally equal in amplitude and opposite in phase to the engine's discrete tonal noise. It is noted that known active noise control techniques reduce narrowband noise from a source by generating a narrowband canceling noise and reduce broadband noise from a source by reducing a narrowband portion thereof. Conventional techniques for generating the canceling noise include using piezoceramic actuator plates to bendably vibrate a panel to produce the canceling noise. The panel may be a part of the aircraft engine, such as a part of the fan shroud, or the panel may be a member which is separate from, but attached to, the aircraft engine. The piezoceramic plate is driven by an electric AC signal such that when the signal is positive, the plate causes the panel to bendably deflect in a first direction from its resting state, and when the signal is negative, the plate causes the panel to bendably deflect in the opposite direction.

The larger the amplitude of the electric AC signal driving the piezoceramic actuator plate, the larger the bending vibration, and hence the louder the canceling noise, produced by the attached panel. To minimize the weight and space penalty of an active noise control system on the fuel consumption of an aircraft engine, it is desirable to use fewer piezoceramic actuator plates. However, the piezoceramic actuator plate will structurally fail when the applied electric AC signal causes the plate to exceed its critical tensile stress which depends on the particular piezoceramic material being used.

When the source noise has a wide frequency bandwidth and/or several dominant frequencies, extra sets of panels are required with each set having a bandwidth corresponding to a dominant bandwidth of the source or a resonant frequency corresponding to a dominant frequency of the source. Finding space for such extra sets of panels can be a problem in certain noise control applications such as in aircraft engines. What is needed is an improved array of subassemblies, of an active noise control system, for generating the canceling noise to reduce noise produced by sources such as aircraft engines.

SUMMARY OF THE INVENTION

It is an object of the invention to provide an active noise control subassembly array, wherein the array is capable of generating a canceling noise required by an active noise control system for reducing noise produced by a source such as an aircraft engine.

The active noise control subassembly array of the invention is for reducing source noise caused by a source independent of the subassembly. The array includes a pair of active noise control subassemblies each including a piezoceramic-driven noise radiating panel, a front plate having a sound exit port, a back plate, and first and second pairs of spaced-apart side walls. The panel is bendably vibratable to generate a panel noise canceling at least a portion of the source noise. The front and back plates are each spaced apart from the panel. The front plate is positioned generally between the source noise and the panel, and the panel is positioned generally between the source noise and the back plate. The first pair of side walls each generally abut the panel and the front plate so as to generally enclose a front cavity to define a resonator. The second pair of side walls each generally abut the panel and the back plate so as to generally enclose a back cavity. The pair of subassemblies are spaced apart to create a space between adjacent side walls of the pair of subassemblies. The array also includes a third active noise control subassembly including a piezoceramic-driven noise radiating sheet and a third pair of spaced-apart side walls. The sheet is bendably vibratable to generate a panel noise canceling at least a portion of the source noise. The sheet is spaced apart from the back plates of the pair of subassemblies. The third pair of side walls each generally abut the sheet and a corresponding back plate of the pair of subassemblies so as to generally enclose a foreground cavity to define a resonator with the space defining a sound exit port.

Several benefits and advantages are derived from the invention. The array of subassemblies combines piezoceramics and resonators in a compact design reducing the space needed for noise control. The resonators can be tuned to have their resonating frequency equal that of the panels thereby boosting the amplitude of the canceling noise. The resonating frequency of the resonators and panels of the pair of subassemblies can be set to cancel a first dominant frequency of discrete tonal noise of the source, and the resonating frequency of the resonator and panel of the third subassembly can be set to cancel a second dominant frequency of discrete tonal noise of the source. Arrays with such stacked rows of subassemblies make efficient use of available space. Thus, with the invention, less space is needed to produce a canceling noise loud enough to significantly reduce aircraft engine noise having two dominant frequencies.

BRIEF OF THE DRAWINGS

The accompanying drawings illustrate a preferred embodiment of the present invention wherein.

DETAILED DESCRIPTION OF THE INVENTION

Figure 1:
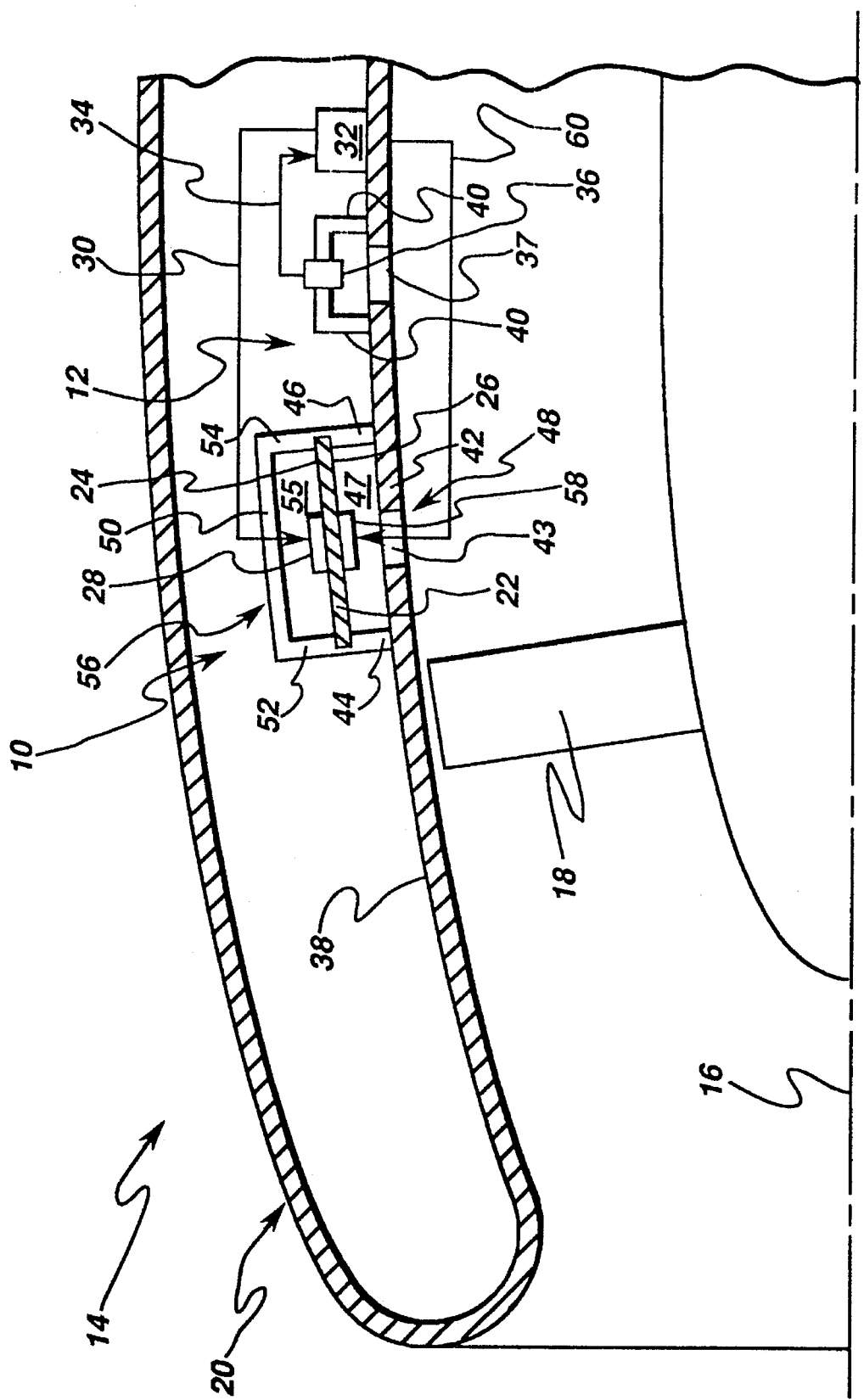
FIG. 1 is a schematic side-elevational, cross-sectional view of a front portion of an aircraft engine including a preferred embodiment of an active noise control subassembly of the array of the invention.

Referring now to the drawings, wherein like numerals represent like elements throughout, FIG. 1 shows an active noise control subassembly 10 which is part of an active noise control system 12. Subassembly 10 is for reducing source noise caused by a source independent of the subassembly 10. Subassembly 10 will be described in terms of the noise being discrete tonal noise having one or more discrete frequencies and the source being an aircraft engine 14 (only the front portion of which is shown in FIG. 1). However, it is understood that the noise can also be narrowband and/or broadband noise and the source can be any source of noise. The aircraft engine 14, which has a generally longitudinally extending centerline 16, includes a fan 18 which rotates within a fan nacelle 20 producing discrete tonal noise predominately at the blade passage frequency and multiples thereof, as can be appreciated by those skilled in the art. It is noted that aircraft engines without fans also produce discrete tonal noise, such as, but not limited to, noise coming from their turbine blades (such turbine blades being omitted from FIG. 1 for clarity).

The active noise control subassembly 10 includes a noise radiating panel 22 bendably vibratable to generate a panel noise canceling at least a portion of the source noise (e.g., the discrete tonal noise of the aircraft engine 14). In some applications, the noise radiating panel is an already existing aircraft engine member, such as the aircraft engine fan shroud (not shown in the figures). In other applications, such as that shown in FIG. 1, the noise radiating panel 22 is a separate member (such as a sheet of 1.5 millimeter thick aluminum) specifically installed in the aircraft engine 14 for noise control purposes. The noise radiating panel 22 has first and second generally opposing sides 24 and 26 and a panel resonating frequency.

The active noise control subassembly 10 also includes a first piezoceramic actuator plate 28 which is vibratable by a first applied electric AC signal 30 generated by a controller 32. The first piezoceramic actuator plate 28 is connected to the first side 24 of the noise radiating panel 22 such that vibrations in the first plate 28 cause bending vibrations in the panel 22. The first applied electric AC signal 30 generated by the controller 32 is such that the bending vibrations in the noise radiating panel 22 produce a panel noise canceling at least a portion of the source noise (e.g., panel noise which is generally opposite in phase to at least a portion of the discrete tonal noise of the aircraft engine 14). In an exemplary embodiment, such discrete tonal noise of the aircraft engine 14 is calculated by the controller 32 in part from engine speed measured by a tachometer (omitted from FIG. 1 for clarity) and in part from a signal 34 of aircraft engine noise from a microphone 36 disposed within the fan nacelle 20 over a sound port 37 in the inner wall 38 of the fan nacelle 20 and attached to supports 40 which are secured to the inner wall 38 of the fan nacelle 20. A best mode would use an array of microphones 36 flush mounted to the inner wall 38 (such arrangement not shown in the figures). The controller 32 may be a digital or analog computer or other control device, as is known to those skilled in the art. It is noted that the active noise control system 12 includes the active noise control subassembly 10, the microphone 36, the tachometer (omitted from FIG. 1 for clarity), and the controller 32. A best mode would employ a system 12 forward and aft of the fan 18.

For purposes of describing the invention, the term "piezoceramic" refers to a material which exhibits a piezoelectric effect and is not limited to commonly called piezoceramic materials but also includes electrostrictive materials while excluding magnetostrictive materials. Typically, the first piezoceramic actuator plate 28 is a sheet (e.g., 50×50×0.25 millimeters) of piezoceramic material bonded to the flat or curved noise radiating panel 22 using an epoxy or alkyl cyanolate compound. Vacuum pads or weights are sometimes used during the bonding process to apply a uniform pressure on the first plate 28, especially when bonding the plate to a curved panel surface. Preferably, a compressive prestress is created in the first plate 28 during the bonding process. A positive electric DC bias in the poling direction may also be added to the first applied electric AC signal 30.

The active noise control subassembly 10 additionally includes a front plate 42. The front plate 42 is spaced apart from the panel 22 and the first plate 28, is disposed generally between the source noise and the panel 22, and has a sound exit port 43 having an area and a thickness. The subassembly 10 further includes a first pair of spaced-apart side walls 44 and 46 each generally abutting the panel 22 and the front plate 42 so as to generally enclose a front cavity 47 to define a resonator 48 (such as, but not limited to, a Helmholtz resonator). It is noted that the spaced-apart side walls 44 and 46 are shown attached to the panel 22 in FIG. 1, but they may be unattached to the panel in other applications. The front cavity 47 has a volume, and the resonator 48 has a resonator resonating frequency. Preferably, the resonator resonating frequency is equal to generally the panel resonating frequency as can be achieved by those of ordinary skill in the art. For a typical panel area of 0.02 square meters, a front cavity volume of 0.125 cubic centimeters, a sound exit port area of 0.2 square centimeters and thickness of 0.5 centimeters, and panel and resonator resonating frequencies each of 1000 Hertz, calculations showed an increase in acoustic power of two orders of magnitude (20 decibels) at 1000 Hertz with improved acoustic power up to about 1700 Hertz when compared with the acoustic power of just the panel 22 without the resonator 48. When the subassembly 10 is used for reducing discrete tonal noise caused by an aircraft engine 14 having a fan 18, it is preferred that the front plate 42 is a shaped portion of the inner wall 38 of the fan nacelle 20 as shown in FIG. 1.

The subassembly 10 preferably includes a back plate 50 spaced apart from the first plate 28 and the panel 22 with the panel 22 disposed generally between the source noise and the back plate 50, and the subassembly 10 preferably further includes a second pair of spaced-apart side walls 52 and 54 each generally abutting the panel 22 and the back plate 50 so as to generally enclose a back cavity 55 and define a chamber 56. It is noted that the spaced-apart side walls 52 and 54 are shown attached to the panel 22 in FIG. 1, but they may be unattached to the panel in other applications. In an exemplary embodiment, the chamber 56 may be used as a tuning chamber to vary the panel resonating frequency while the panel 22 is undergoing bending vibrations. This may be done by varying the state of the back cavity 55 such as by varying its fluid pressure and/or volume.

In a preferred embodiment, the active noise control subassembly 10 includes a second piezoceramic actuator plate 58 which is vibratable by a second applied electric AC signal 60 generated by the controller 32. The second piezoceramic actuator plate 58 is connected to the second side 26 of the noise radiating panel 22 such that vibrations in the second plate 58 cause bending vibrations in the panel 22. The second applied electric AC signal 60 generated by the controller 32 is such that the bending vibrations in the noise radiating panel 22 produce a panel noise canceling at least a portion of the source noise (e.g., panel noise which is generally opposite in phase to at least a portion of the discrete tonal noise of the aircraft engine 14). It is noted that the first and second piezoceramic actuator plates 28 and 58 are powered "out-of-phase" so that, for example, the first plate 28 expands while the second plate 58 contracts. When two piezoceramic actuator plates 28 and 58 are used, it is preferred that their combined effect results in causing bending vibrations in the noise radiating panel 22 which produce a canceling noise which is generally equal in amplitude to at least a portion of the aircraft engine discrete tonal noise. It is also preferred that when only one piezoceramic actuator plate 28 or 58 is used, its effect results in causing bending vibrations in the panel 22 which produce a canceling noise generally equal in amplitude to at least a portion of the aircraft engine discrete tonal noise.

In an exemplary embodiment, the active noise control subassembly 10 includes means (not shown) for varying the resonator resonating frequency, while the panel 22 is undergoing the bending vibrations, such as by varying: the volume of the front cavity 47; the area of the sound exit port 43 of the front plate 42; and/or the thickness of the sound exit port 43 of the front plate 42.

Figure 2:
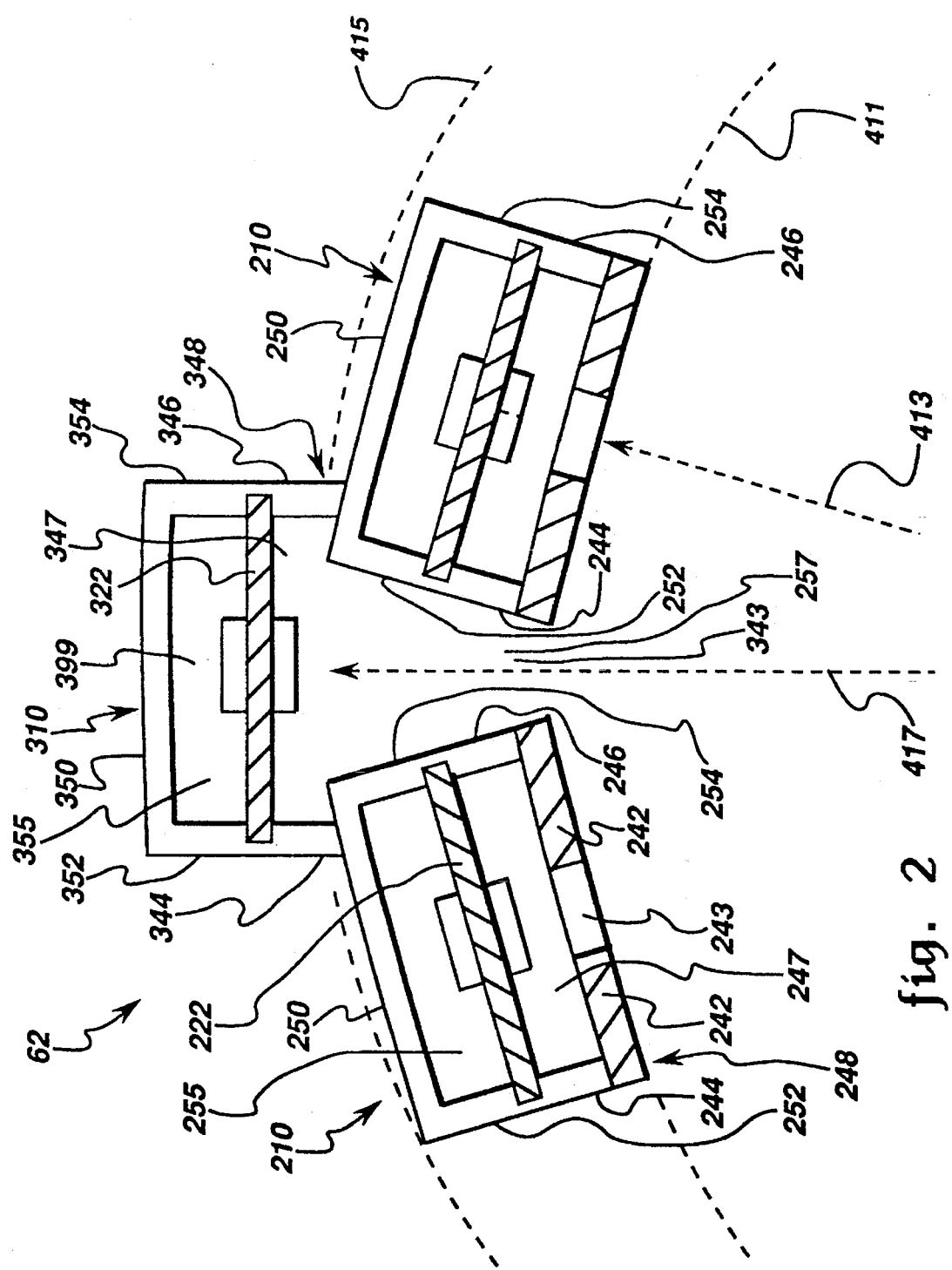
FIG. 2 is a schematic front-elevational, cross-sectional view of a preferred embodiment of the active noise control subassembly array of the invention.
Figure 3:
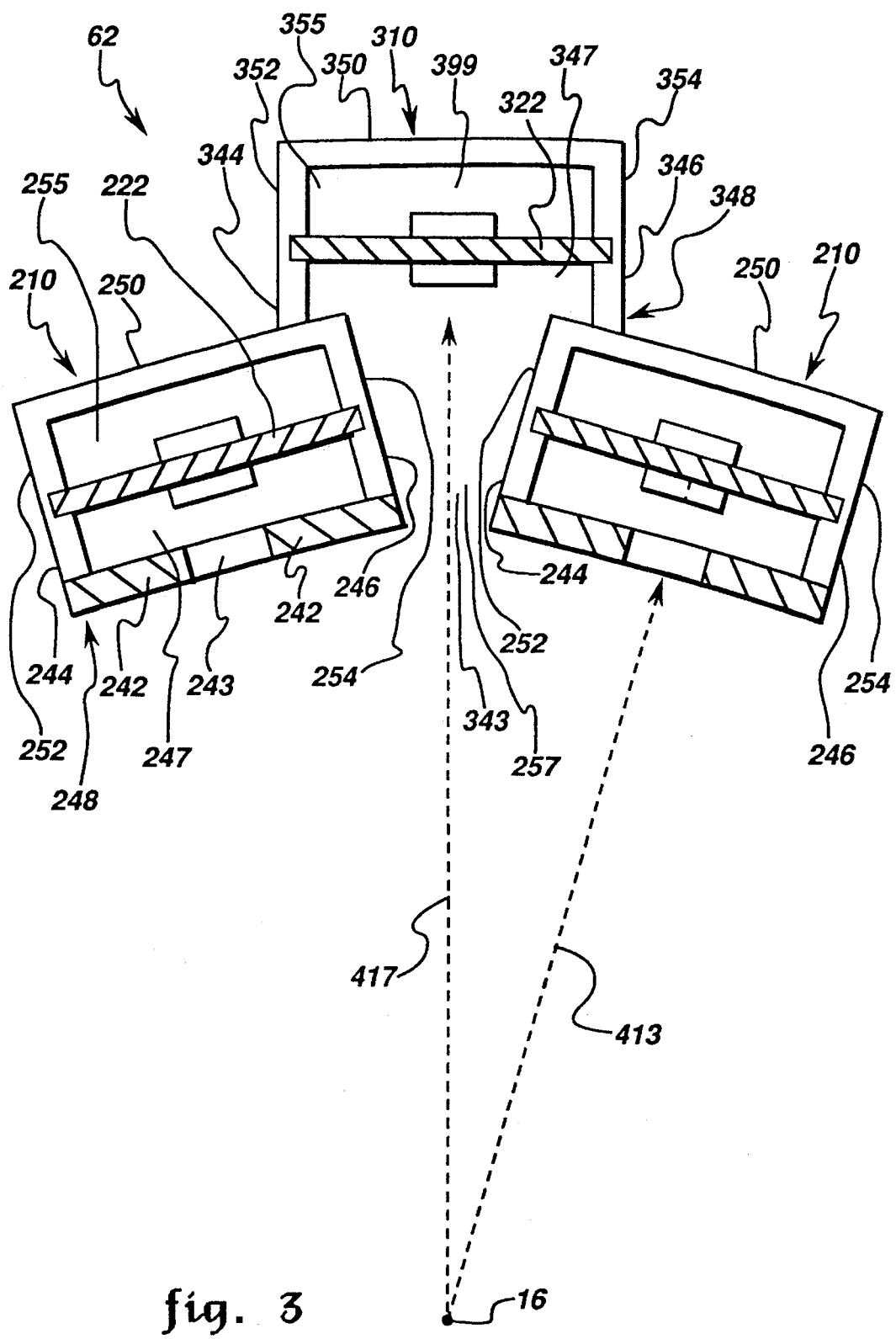
FIG. 3 is a view of the array of FIG. 2 which also shows the engine centerline.

FIGS. 2 and 3 show a preferred embodiment of the active noise control subassembly array 62 of the present invention. The array 62 is for reducing noise caused by a source independent of the array 62. Preferably, the source is the aircraft engine 14 of FIG. 1 with the array 62 of FIG. 2 being thought of as replacing the subassembly 10 in FIG. 1, as can be appreciated by those skilled in the art. The array 62 includes a pair of active noise control subassemblies 210 each generally identical to the subassembly 10 of FIG. 1 and each including: 1) a piezoceramic-driven noise radiating panel 222 bendably vibratable to generate a panel noise canceling at least a portion of the source noise and having a panel resonating frequency;, 2) a front plate 242 spaced apart from the panel 222 and having a sound exit port 243; 3) a first pair of spaced-apart side walls 244 and 246 each generally abutting the panel 222 and the front plate 242 so as to generally enclose a front cavity 247 to define a resonator 248 having a resonator resonating frequency; 4) a back plate 250 spaced apart from the panel 222; and 5) a second pair of spaced-apart side walls 252 and 254 each generally abutting the panel 222 and the back plate 250 so as to generally enclose a back cavity 255, wherein the pair of subassemblies 210 are spaced apart to create a space 257 between adjacent side walls 246 & 244 and 254 & 252 of the pair of subassemblies 210. The array 62 also includes a third active noise control subassembly 310 generally identical to the subassembly 10 of FIG. 1 and including: 1) a piezoceramic-driven noise radiating sheet 322 bendably vibratable to generate a panel noise canceling at least a portion of the source noise and having a sheet resonating frequency, the sheet 322 spaced apart from the back plates 250 of the pair of subassemblies 210; and 2) a third pair of spaced-apart side walls 344 and 346 each generally abutting the sheet 322 and a corresponding back plate 250 of the pair of subassemblies 210 so as to generally enclose a foreground cavity 347 to define a resonator 348 having a resonator resonating frequency and with the space 257 defining a sound exit port 343.

In an exemplary embodiment, the third subassembly 310 also includes a background plate 350 spaced apart from the sheet 322 and further includes a fourth pair of spaced-apart side walls 352 and 354 each generally abutting the sheet 322 and the background plate 350 so as to generally enclose a background cavity 355.

Preferably, the resonating frequencies are related as follows. The resonator resonating frequency of one (e.g., the left-most as seen in FIG. 2) of the pair of subassemblies 210 is equal to generally the panel resonating frequency of the one (e.g., the left-most) of the pair of subassemblies 210, and the resonator resonating frequency of the other (e.g., the right-most as seen in FIG. 2) of the pair of subassemblies 210 is equal to generally the panel resonating frequency of the other (e.g., the right-most) of the pair of subassemblies 210. The resonator resonating frequency of the one (e.g., the left-most) of the pair of subassemblies 210 is generally equal to the resonator resonating frequency of the other (e.g., the right-most) of the pair of subassemblies 210. The resonator resonating frequency of the third subassembly 310 is equal to generally the panel resonating frequency of the third subassembly 310. Preferably, the resonator resonating frequency of the third subassembly 310 is different from the resonator resonating frequency of the one (e.g., the left-most) of the pair of subassemblies 210.

As previously noted, preferably the source is an aircraft engine 14 having a fan 18, and the front plates 242 of the pair of subassemblies 210 are portions of an inner wall 38 of a fan nacelle 20. When the discrete tonal noise includes first and second dominant frequencies, it is preferred that the resonator resonating frequency of the one (e.g., the left-most) of the pair of subassemblies 210 is equal to generally the first dominant frequency, and the resonator resonating frequency of the third subassembly 310 is equal to generally the second dominant frequency.

Also, as previously noted, the fan 18 rotates about an engine centerline 16 (seen in both FIGS. 1 and 3). Preferably, as shown in FIGS. 2 and 3, the pair of subassemblies 210 is disposed generally on a first circle 411 which has a first radius 413 and which is coaxially aligned with the centerline 16, and the third subassembly 310 is disposed generally on a second circle 415 which has a second radius 417 and which is coaxially aligned with the centerline 16. The circles 411 and 415 and the radii 413 and 417 are shown as dashed lines in FIGS. 2 and 3. It is noted that the second radius 417 is longer than the first radius 413.

The foregoing description of a preferred embodiment of the invention has been presented for purposes of illustration. It is not intended to be exhaustive or to limit the invention to the precise form disclosed, and obviously many modifications and variations are possible in light of the above teaching. For example, additional subassemblies can be added to the straight or curved line or flat or curved plane containing the pair of subassemblies 210, additional subassemblies can be added to the straight or curved line or flat or curved plane containing the third subassembly 310, and additional straight or curved lines or flat or curved planes of subassemblies can be stacked on top of the line or plane containing the third subassembly 310 to cancel additional dominant frequencies of discrete tonal noise of the source as can be appreciated by the artisan by picturing FIG. 2 in three dimensions. It is intended that the scope of the invention be defined by the claims appended hereto.

I claim:

1. An active noise control subassembly array for reducing source noise caused by a source independent of said array, said array comprising:
   a) a pair of active noise control subassemblies each including:
      1) a piezoceramic-driven noise radiating panel bendably vibratable to generate a panel noise canceling at least a portion of the source noise and having a panel resonating frequency;
      2) a front plate spaced apart from said panel, disposed generally between said source noise and said panel, and having a sound exit port;
      3) a first pair of spaced-apart side walls each generally abutting said panel and said front plate so as to generally enclose a front cavity to define a resonator having a resonator resonating frequency;
      4) a back plate spaced apart from said panel with said panel disposed generally between said source noise and said back plate; and
      5) a second pair of spaced-apart side walls each generally abutting said panel and said back plate so as to generally enclose a back cavity, wherein said pair of subassemblies are spaced apart to create a space between adjacent side walls of said pair of subassemblies; and
   b) a third active noise control subassembly including:
      1) a piezoceramic-driven noise radiating sheet bendably vibratable to generate a sheet noise canceling at least a portion of the source noise and having a sheet resonating frequency, said sheet spaced apart from said back plates of said pair of subassemblies; and
      2) a third pair of spaced-apart side walls each generally abutting said sheet and a corresponding back plate of said pair of subassemblies so as to generally enclose a foreground cavity to define a resonator having a resonator resonating frequency and with said space defining a sound exit port.

2. The array of claim 1, wherein said third subassembly also includes a background plate spaced apart from said sheet and further includes a fourth pair of spaced-apart side walls each generally abutting said sheet and said background plate so as to generally enclose a background cavity.

3. The array of claim 1, wherein said resonator resonating frequency of one of said pair of subassemblies is equal to generally said panel resonating frequency of said one of said pair of subassemblies and wherein said resonator resonating frequency of the other of said pair of subassemblies is equal to generally said panel resonating frequency of said other of said pair of subassemblies.

4. The array of claim 3, wherein said resonator resonating frequency of said one of said pair of subassemblies is generally equal to said resonator resonating frequency of said other of said pair of subassemblies.

5. The array of claim 4, wherein said resonator resonating frequency of said third subassembly is equal to generally said panel resonating frequency of said third subassembly.

6. The array of claim 5, wherein said resonator resonating frequency of said third subassembly is different from said resonator resonating frequency of said one of said pair of subassemblies.

7. The array of claim 6, wherein said source is an aircraft engine having a fan and wherein said front plates of said pair of subassemblies are portions of an inner wall of a fan nacelle.

8. The array of claim 7, wherein said discrete tonal noise includes first and second dominant frequencies, wherein said resonator resonating frequency of said one of said pair of subassemblies is equal to generally said first dominant frequency, and wherein said resonator resonating frequency of said third subassembly is equal to generally said second dominant frequency.

9. The array of claim 8, wherein said fan rotates about an engine centerline, wherein said pair of subassemblies is disposed generally on a first circle which has a first radius and which is coaxially aligned with said centerline, wherein said third subassembly is disposed generally on a second circle which has a second radius and which is coaxially aligned with said centerline, and wherein said second radius is longer than said first radius.

10. The array of claim 9, wherein said third subassembly also includes a background plate spaced apart from said sheet and further includes a fourth pair of spaced-apart side walls generally abutting said sheet and said background plate so as to generally enclose a background cavity.

* * * * *